US009845919B2

(12) United States Patent
McDonald et al.

(10) Patent No.: US 9,845,919 B2
(45) Date of Patent: Dec. 19, 2017

(54) CRYOGENIC PLUMBING SUPPORT FOR VEHICLES

(71) Applicant: Caterpillar Inc., Peoria, IL (US)

(72) Inventors: Robbi Lynn McDonald, Richmond (CA); Ankur Harshkant Vayeda, Vancouver (CA); Gregory Charles Harper, Delta (CA)

(73) Assignee: Caterpillar Inc., Peoria, IL (US)

( * ) Notice: Subject to any disclaimer, the term of this patent is extended or adjusted under 35 U.S.C. 154(b) by 361 days.

(21) Appl. No.: 14/619,839

(22) Filed: Feb. 11, 2015

(65) Prior Publication Data

US 2016/0229364 A1 Aug. 11, 2016

(51) Int. Cl.

| | |
|---|---|
| ***F17C 13/08*** | (2006.01) |
| ***F17C 13/00*** | (2006.01) |
| ***F16L 3/00*** | (2006.01) |
| ***F16L 3/01*** | (2006.01) |
| ***F16L 3/16*** | (2006.01) |
| ***F16L 3/18*** | (2006.01) |

(Continued)

(52) U.S. Cl.

CPC .......... *F17C 13/083* (2013.01); *F17C 13/084* (2013.01); *F17C 2205/0196* (2013.01); *F17C 2221/033* (2013.01); *F17C 2223/0161* (2013.01); *F17C 2223/033* (2013.01); *F17C 2270/0171* (2013.01)

(58) Field of Classification Search

CPC .. F17C 13/083; F17C 13/084; F17C 2205/03; F17C 2205/0196; F17C 2205/0352; F17C 2205/0364; F17C 2205/0367; F17C 2270/0171; F16L 55/035; F16L 3/01; F16L 3/16; F16L 3/182; F16L 3/227; B60K 15/03; B60K 2015/03026; B60K 2015/03315; B60K 2015/03447; B60K 2015/0477; B60K 2015/0474

USPC ........... 248/644, 65, 161, 157, 163.1, 188.2, 248/188.4, 218.4, 219.1, 219.2, 219.4

See application file for complete search history.

(56) References Cited

U.S. PATENT DOCUMENTS

| | | | | |
|---|---|---|---|---|
| 5,869,746 | A * | 2/1999 | Watanabe | B60K 15/013 62/50.7 |
| 7,775,391 | B2 | 8/2010 | Harper | |
| 7,819,273 | B2 | 10/2010 | Yang et al. | |

(Continued)

FOREIGN PATENT DOCUMENTS

| | | | |
|---|---|---|---|
| CN | 202613038 | U | 12/2012 |
| KR | 101412486 | B1 | 7/2014 |
| KR | 101414861 | B1 | 7/2014 |

*Primary Examiner* — Frantz Jules
*Assistant Examiner* — Erik Mendoza-Wilkenfel
(74) *Attorney, Agent, or Firm* — Miller, Matthias & Hull LLP

(57) ABSTRACT

A cryogenic plumbing support for supporting cryogenic plumbing having a first coefficient of thermal expansion associated with a cryogenic temperature may include a bracket. The bracket may include a second coefficient of thermal expansion approximately equal to the first coefficient of thermal expansion. The cryogenic plumbing support may also include a slide assembly. The slide assembly may include first and second end blocks, at least one slider, and a plurality of rods. The first end block may be coupled in spaced relationship to the second end block by the plurality of rods. The at least one slider may be coupled to the bracket and slidably coupled to the plurality of rods.

9 Claims, 4 Drawing Sheets

(51) Int. Cl.
*F16L 3/20* (2006.01)
*B60K 15/03* (2006.01)

(56) References Cited

U.S. PATENT DOCUMENTS

| | | | | |
|---|---|---|---|---|
| 2003/0146214 | A1* | 8/2003 | Idoguchi .................. | F17C 1/00<br>220/23.83 |
| 2004/0075034 | A1* | 4/2004 | Yokote .................. | F17C 13/084<br>248/312 |
| 2009/0283351 | A1* | 11/2009 | Cannet ...................... | F17C 7/00<br>180/302 |
| 2012/0097830 | A1* | 4/2012 | Magnani ............... | F17C 13/084<br>248/688 |
| 2013/0187374 | A1* | 7/2013 | Karlsson ................. | F17C 1/002<br>285/47 |
| 2013/0240541 | A1 | 9/2013 | Jordan et al. | |
| 2014/0174106 | A1 | 6/2014 | Tang et al. | |

* cited by examiner

CRYOGENIC PLUMBING SUPPORT FOR VEHICLES

TECHNICAL FIELD

The present disclosure relates generally to plumbing supports for a vehicle and, more particularly, to cryogenic plumbing supports for a storage container transported by a vehicle.

BACKGROUND

In some vehicles with diesel-cycle engines a gaseous fuel is used in place of diesel fuel. In these applications, the gaseous fuel is typically stored in a liquefied state at a cryogenic temperature. As an example, the vehicle may have a cryogenic storage tank that stores liquefied natural gas (LNG). The cryogenic plumbing used to deliver the LNG from the cryogenic storage tank to the engine of the vehicle experiences thermal cycles ranging from ambient temperature to LNG temperatures. As the temperature approaches LNG temperatures thermal contraction of the cryogenic plumbing occurs. In order to accommodate for the thermal contraction, conventional LNG plumbing systems employ various techniques such as using flexible hoses, bellows, and bends in the plumbing, to name a few examples. These traditional techniques help reduce stresses, caused from the thermal contraction, on the rigid support systems for the LNG plumbing. While effective, such support systems for the LNG plumbing, however, do not accommodate for the vertical and horizontal shock loads created during movement of the vehicle.

Although the various techniques of using flexible hoses, bellows, and bends in the plumbing help to reduce stresses in traditional LNG plumbing systems, these techniques commonly occupy a substantial amount of space. As such, these traditional techniques are non-ideal for space-limited vehicles. Additionally, such traditional techniques are also non-ideal for cryogenic plumbing systems that utilize high-pressure direct-injection (HPDI) systems, which require rigid plumbing.

U.S. Pat. No. 7,775,391 (the '391 patent) discloses a container for holding a cryogenic fuel. While the '391 patent teaches a straight conduit portion of the plumbing, it fails to teach the straight conduit portion of the plumbing in relation to being supported on the exterior of the container to accommodate for vertical shock loads and thermal contraction of the plumbing.

SUMMARY

In accordance with an aspect of the disclosure, a cryogenic plumbing support for supporting cryogenic plumbing on a vehicle from vertical shock loads and allowing for thermal contraction of the cryogenic plumbing that includes a first coefficient of thermal expansion associated with a cryogenic temperature is provided. The cryogenic plumbing support may include a bracket including a second coefficient of thermal expansion approximately equal to the first coefficient of thermal expansion. The cryogenic plumbing support may also include a slide assembly. The slide assembly may include first and second end blocks, at least one slider, and a plurality of rods. The first end block may be coupled in spaced relationship to the second end block by the plurality of rods. The at least one slider may be slidably coupled to the plurality of rods and may be coupled to the bracket.

In accordance with another aspect of the disclosure, a storage container for storing a gaseous fluid in a cryogenic state is provided. The storage container may include a head. A manifold may be coupled to the head. A cryogenic plumbing assembly may be fluidly coupled to the manifold. A slide assembly may include first and second end blocks, at least one slider, and a plurality of rods. The first end block may be coupled in spaced relationship to the second end block by the plurality of rods. The at least one slider may be slidably coupled to the plurality of rods and may be coupled to the cryogenic plumbing assembly. First and second support blocks may be disposed on the head. The first and second end blocks may be coupled to a plurality of posts. At least one post of the plurality of posts may extend from the first support block and at least one other post of the plurality of posts may extend from the second support block.

In accordance with yet another aspect of the disclosure, a method for supporting a cryogenic plumbing on a vehicle is provided. The method may entail the step of providing a slide assembly onto a head of a storage container. The slide assembly may include at least one slider. Another step may be coupling the at least one slider to the cryogenic plumbing for supporting the cryogenic plumbing from vertical shock loads during movement of the vehicle and for allowing the cryogenic plumbing to operationally slide with the at least one slider during thermal contraction of the cryogenic plumbing.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

The present disclosure provides systems and methods for supporting the cryogenic plumbing on a vehicle. Such systems and methods may support the cryogenic plumbing to allow for thermal contraction of the cryogenic plumbing. Such systems and methods may also support the cryogenic plumbing to accommodate for vertical shock loads in a mobile environment.

Figure 1:
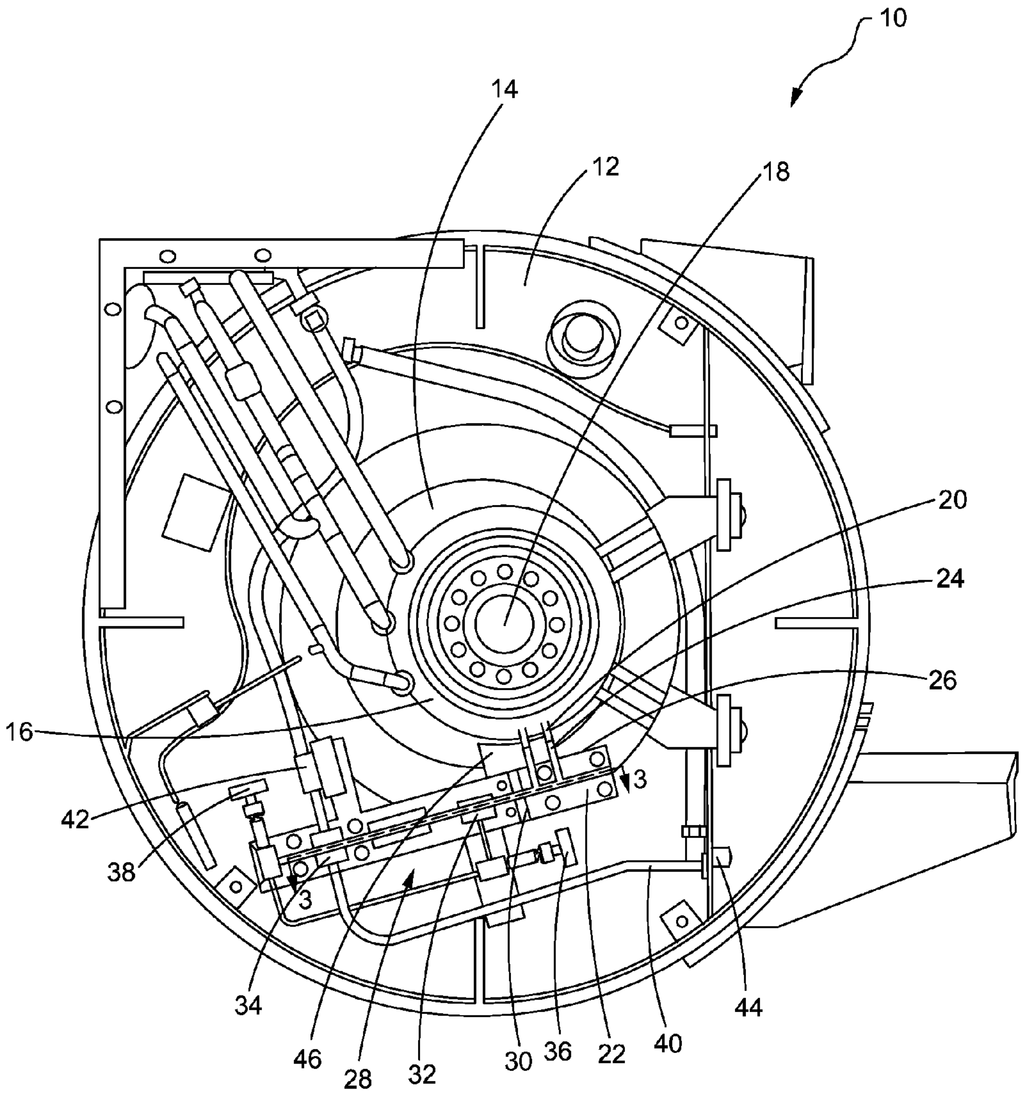
FIG. 1 is a top plan view of a storage container with a cryogenic plumbing support in accordance with the teachings of the present disclosure.

Referring now to FIG. 1, an exemplary storage container constructed in accordance with the present disclosure is generally referred to by reference numeral 10. The storage container 10 may have a cylindrical shape and may have a convex shaped head 12. The storage container 10 may be associated with a vehicle (not shown) such as, but not limited to, a large mining truck so that the storage container 10 is operationally secured thereto and absorbs any vertical shock loads during travel. A gaseous fuel in a cryogenic state such as, but not limited to, liquefied natural gas (LNG) may be stored in the storage container 10 to fuel the vehicle. A container flange 14 may be disposed on the head 12. The container flange 14 may be approximately centrally located on the head 12 and may have a circular shape. A pump flange 16 may be disposed on the container flange 14 to secure a pump 18 to the container flange 14. The pump 18 may be fluidly associated with the interior of the storage container 10. Pump tubes 20 may be fluidly coupled to the pump 18 and may extend outwardly through the pump flange 16.

The pump tubes 20 are also fluidly coupled to a manifold 22 via connecting tubes 24 extending from a first side 26 of the manifold 22. A cryogenic plumbing assembly 28 may be fluidly coupled to a second side 30 of the manifold 22. The first side 26 may be orthogonal to the second side 30. The cryogenic plumbing assembly 28 may include a plumbing grouping 32, a 4-way manifold 34, first and second hand valves 36, 38, a delivery tube 40, and a plumbing member 42. The plumbing grouping 32, the second hand valve 38, the delivery tube 40, and the plumbing member 42 may all be fluidly coupled to the 4-way manifold 34 such that the plumbing grouping 32 may be disposed opposite the second hand valve 38 and the plumbing member 42 may be disposed opposite the delivery tube 40. The delivery tube 40 may include a fitting 44, which may be coupled to a vehicle. The first hand valve 36 may be operationally coupled to the plumbing grouping 32. The plumbing member 42 may be, but not limited to, a pressure relief valve (PRV) having an outlet end that may be coupled to a vent piping via a flexible line.

Figure 2:
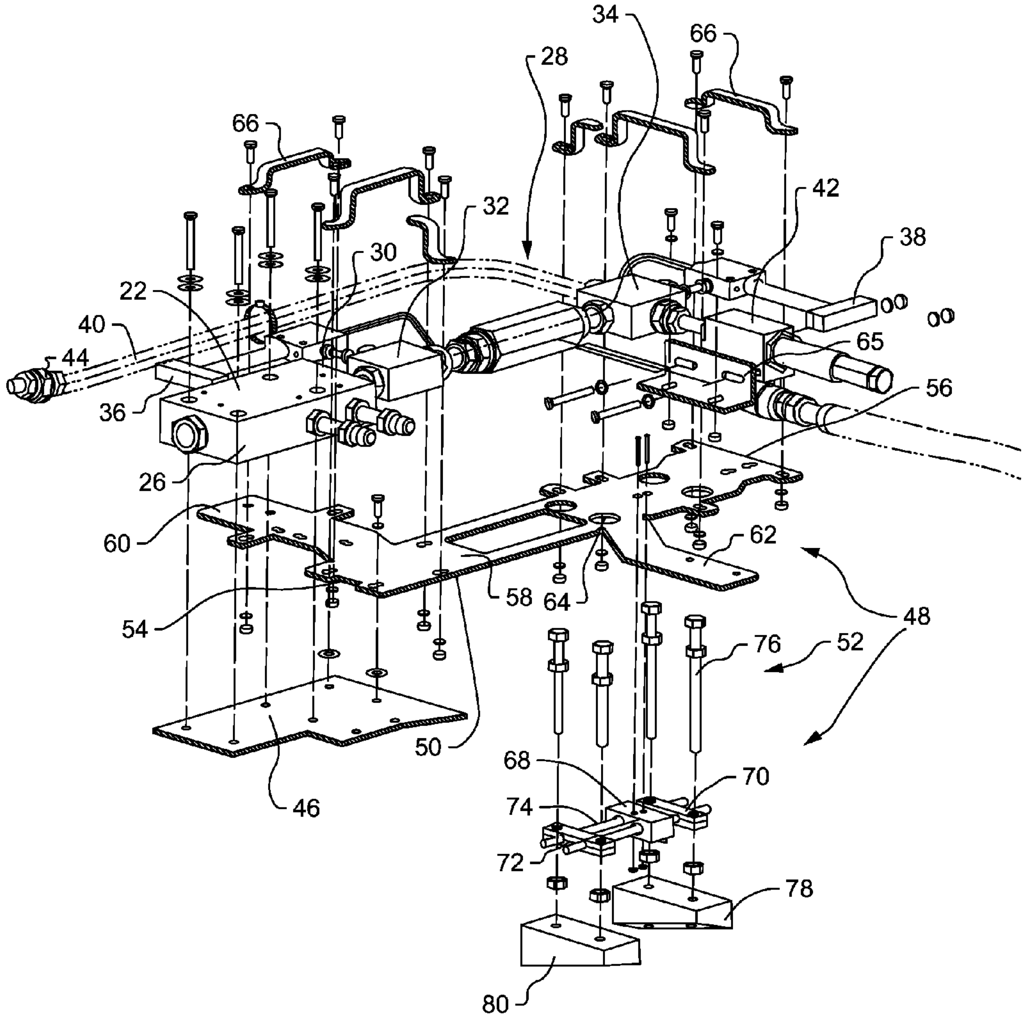
FIG. 2 is an exploded view of the cryogenic plumbing support of FIG. 1 in accordance with the teachings of the present disclosure.

As best seen in FIGS. 1 and 2, a plate 46 may be mounted to the container flange 14. The manifold 22 may be mounted to the plate 46 so as to be securely fixed to the container flange 14. Furthermore, the cryogenic plumbing assembly 28 may be supported by a support assembly 48, which may include a support bracket 50 and a slide assembly 52. The support bracket 50 may include a first and second end 54, 56. The support bracket 50 also includes a longitudinal expanse 58 disposed between the first end 54 and the second end 56. A valve flange 60 may extend outwardly from the longitudinal expanse 58 proximate the first end 54. A member flange 62 may extend outwardly from the longitudinal expanse 58, in an opposite direction of the valve flange 60, proximate the second end 56. The first end 54 may be secured to the plate 46. A plurality of apertures 64 may be disposed through the support bracket 50 in an area of the longitudinal expanse 58 that is adjacent the second end 56 and the member flange 62.

The cryogenic plumbing assembly 28 may be supported by, and be in thermal contact with, the support bracket 50 of the support assembly 48 in such a way that the second hand valve 38 may be coupled to the longitudinal expanse 58 adjacent the second end 56; the 4-way manifold 34 may be coupled to the longitudinal expanse 58 adjacent the plurality of apertures 64; the plumbing member 42 may be coupled to the member flange 62 via an L-bracket 65; the plumbing grouping 32 may be coupled to the longitudinal expanse 58 between the first end 54 and the plurality of apertures 64; the first hand valve 36 may be coupled to the valve flange 60; and the delivery tube 40 may also be coupled to the valve flange 60. The first and second hand valves 36, 38, the 4-way manifold 34, the plumbing grouping 32 and the delivery tube 40 may be coupled to the support bracket 50 by a plurality of clamps 66 or other suitable means known in the industry. The cryogenic plumbing assembly 28 and the support bracket 50 may be manufactured from similar materials known in the industry that have approximately similar coefficients of thermal expansion (CTE) associated with cryogenic temperatures.

The slide assembly 52 may include at least one slider 68 that is operationally slidable between first and second end blocks 70, 72. The first end block 70 may be coupled to the second end block 72 by a plurality of rods 74 along which the at least one slider 68 may slide. The slide assembly 52 may also include a plurality of posts 76 and first and second support blocks 78, 80. First and second support blocks 78, 80 may be disposed on the head 12 of the storage container 10 and spaced apart from each other. The first and second support blocks 78, 80 securely support the plurality of posts 76 so that at least two posts of the plurality of posts 76 extend outwardly from each of the first and second support blocks 78, 80. In such a manner, the first end block 70 may be adjustably secured to the plurality of posts 76 corresponding with the first support block 78 such that the first end block 70 and the first support block 78 are in spaced relationship with each other. Similarly, the second end block 72 may be adjustably secured to the plurality of posts 76 corresponding with the second support block 80 such that the second end block 72 and the second support block 80 are in spaced relationship with each other. The at least one slider 68 may be manufactured from a polytetrafluoroethylene material or similar material known in the industry.

Figure 3:
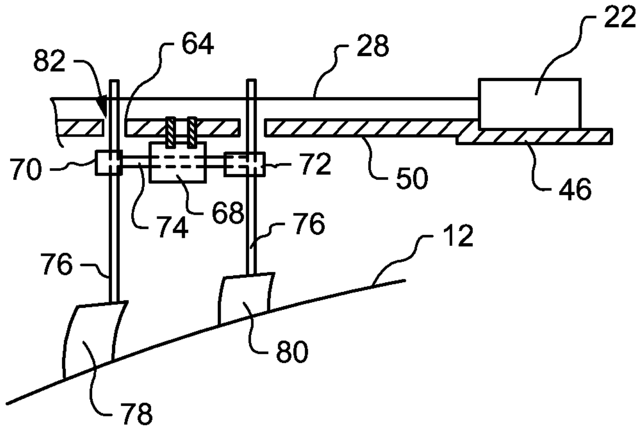
FIG. 3 is a detailed cross-sectional view of the cryogenic plumbing support taken a long line 3-3 of FIG. 1 with portions broken away to show details in accordance with the teachings of the present disclosure.

As best shown in FIG. 3, the at least one slider 68 may be coupled to the support bracket 50. In particular, the at least one slider 68 may be coupled to the longitudinal expanse 58 adjacent the plurality of apertures 64 in such a manner that each post of the plurality of posts 76 extend through corresponding apertures of the plurality of apertures 64. The plurality of posts 76 extend through the plurality of apertures 64 without making contact so that a clearance 82 is provided between each post and aperture.

Figure 4:
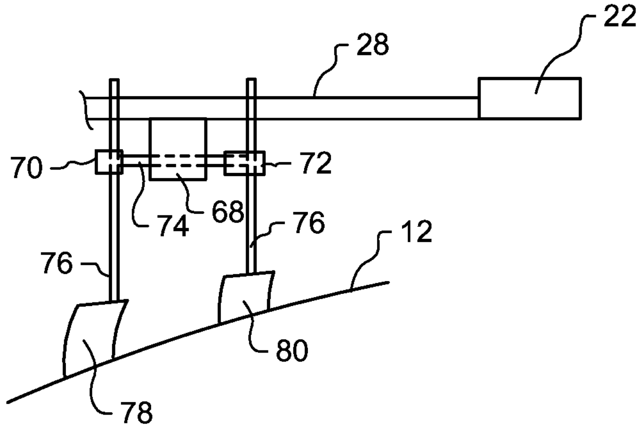
FIG. 4 is a detailed side view of an exemplary alternative embodiment of a cryogenic plumbing support with portions sectioned and broken away to show details in accordance with the teachings of the present disclosure.

In an exemplary alternative embodiment depicted in FIG. 4, the cryogenic plumbing assembly 28 may be directly coupled to the slide assembly 52 without the use of the support bracket 50. For example, the 4-way manifold 34 may be coupled directly to the at least one slider 68. Additionally, the first and second support blocks 78, 80 securely support the plurality of posts 76 so that at least one post of the plurality of posts 76 extends outwardly from each of the first and second support blocks 78, 80. While FIG. 4 illustrates this arrangement the first and second support blocks 78, 80 may also support the plurality of posts 76 so that as least two posts of the plurality of posts 76 extend outwardly from each of the first and second support blocks 78, 80. This arrangement of at least one post of the plurality of posts 76 extending outwardly from each of the first and second support blocks 78, 80 may also similarly be applied to the support assembly 48 described above in reference to FIGS. 1-3.

Figure 5:
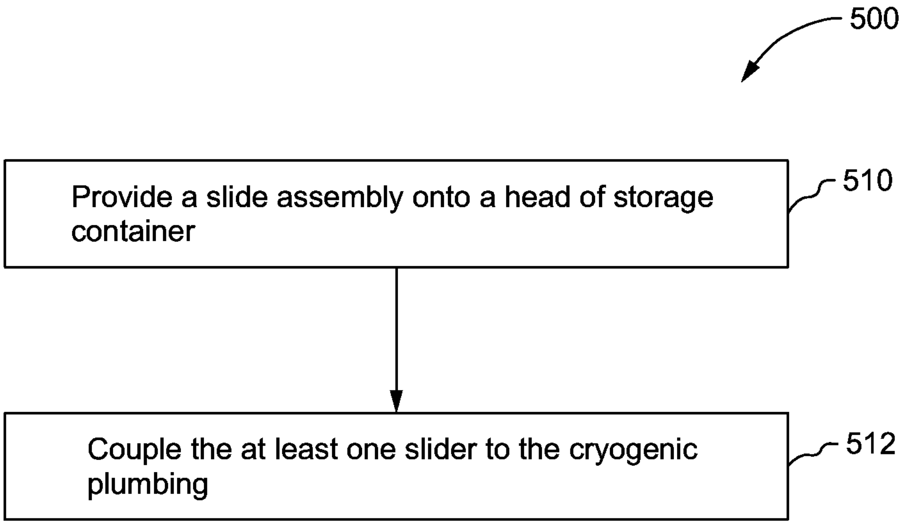
FIG. 5 is a flow chart illustrating a sample sequence of steps which may be practiced in accordance with the teaching of the present disclosure.

FIG. 5 illustrates a flowchart 500 of a sample sequence of steps which may be performed to support the cryogenic plumbing assembly 28 onto the head 12 of the storage container 10 on a vehicle. Box 510 shows the step of providing the slide assembly 52 onto the head 12 of the storage container 10. The slide assembly 52 may include at least one slider 68. Another step as illustrated in box 512 is coupling the at least one slider 68 to the cryogenic plumbing assembly 28 for supporting the cryogenic plumbing assembly 28 from vertical shock loads during movement of the vehicle and for allowing the cryogenic plumbing assembly 28 to operationally slide with the at least one slider 68 during thermal contraction of the cryogenic plumbing assembly 28. The support bracket 50 may couple the at least one slider 68 to the cryogenic plumbing assembly 28. The support bracket 50 and the cryogenic plumbing assembly 28 may have approximately similar coefficients of thermal expansion associated with a cryogenic temperature so that both undergo thermal contraction at approximately the same rate. The support bracket 50 and the cryogenic plumbing assembly 28 may be in thermal contact with each other. The method may also include clamping the cryogenic plumbing assembly 28 to the support bracket 50. The support bracket 50 may include a plurality of apertures 64 that receive the plurality of posts 76 of the slide assembly 52 such that the clearance 82 may be provided between each aperture of the plurality of apertures 64 and each corresponding post of the plurality of posts 76.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth systems and methods for supporting the cryogenic plumbing on a vehicle from vertical and horizontal shock loads while allowing for thermal contraction of the cryogenic plumbing. For example, during operation, the cryogenic plumbing assembly 28 undergoes thermal cycles that approximately range from ambient temperature to cryogenic temperature such as, but not limited to, LNG temperature, which may be approximately −160° C. As the temperature approaches cryogenic levels, the cryogenic plumbing assembly 28 thermally contracts towards the manifold 22, which remains stationary. In one exemplary embodiment with the cryogenic plumbing assembly 28 being in thermal contact with the support bracket 50, the support bracket 50 also undergoes thermal contraction toward the manifold 22 due to the thermal conduction between the support bracket 50 and the cryogenic plumbing 28. Moreover, the cryogenic plumbing assembly 28 and the support bracket 50 have approximately similar coefficients of thermal expansion so that both undergo thermal contraction toward the manifold 22 at approximately the same rate. Because the support bracket 50 is also coupled to the at least one slider 68, the support bracket 50 is able to thermally contract toward the manifold 22 without causing any stresses on the cryogenic plumbing assembly 28 and the plurality of posts 76 of the support assembly 48. The clearance 82 between each post of the plurality of posts 76 and each aperture of the plurality of apertures 64 is designed to also allow the support bracket 50 to thermally contract without causing any stresses on the plurality of posts 76 and the cryogenic plumbing assembly 28. The clearance 82 accommodates for the distance that the support bracket 50 contracts toward the manifold 22. While the support assembly 48 allows for thermal contraction of the cryogenic plumbing assembly 28, it also supports the cryogenic plumbing assembly 28, due to the coupling of the first and second end blocks 70, 72 to the plurality of posts 76 and the support blocks 78, 80, as well as, the coupling of the support bracket 50 to the plate 46, from any vertical and horizontal shock loads that may be experienced during movement of the vehicle.

In an alternative exemplary embodiment without the support bracket 50, the cryogenic plumbing assembly 28 is directly coupled to the slide assembly 52 to accommodate for the thermal contraction of the cryogenic plumbing assembly 28 toward the manifold 22. As such, the coupling of the slide assembly 52 to the plurality of posts 76 supports the cryogenic plumbing assembly 28 from any vertical and horizontal shock loads that may be experienced during movement of the vehicle.

The exemplary embodiments discussed above support the cryogenic plumbing of a vehicle onto a storage container having ambient temperatures. The exemplary embodiments may be useful for vehicles that have space restrictions and cannot accommodate the use of large space-restrictive components such as expensive insulated cryogenic plumbing supports and/or flexible hoses, bellows, or bends found in prior art cryogenic plumbing. Additionally, the exemplary embodiments may use rigid piping and tubing in the cryogenic plumbing and, as such, may be utilized in applications that employ high-pressure direct-injection (HPDI) systems, which require rigid piping and tubing to accommodate for the high pressure. Moreover, the slide assembly includes tight tolerances that enable the handling of the vertical and horizontal shock loads, which are not accommodated for in prior supports for stationary applications because these prior supports typically lack tight tolerances and are only capable of withstanding the downward gravity load.

What is claimed is:

1. A storage container for storing a gaseous fluid in a cryogenic state, the storage container comprising:

a head;

a manifold coupled to the head;

a cryogenic plumbing assembly fluidly coupled to the manifold;

a slide assembly including first and second end blocks, at least one slider, and a plurality of rods, the first end block coupled in spaced relationship to the second end block by the plurality of rods, the at least one slider slideably coupled to the plurality of rods, the at least one slider coupled to the cryogenic plumbing assembly;

first and second support blocks disposed on the head; and a plurality of posts, the first and second end blocks coupled to the plurality of posts, at least one post of the plurality of posts extending from the first support block, at least one other post of the plurality of posts extending from the second support block.

2. The storage container of claim 1, further including a bracket coupling the cryogenic plumbing assembly to the at least one slider.

3. The storage container of claim 2, wherein the bracket and the cryogenic plumbing assembly have approximately similar coefficients of thermal expansion associated with a cryogenic temperature.

4. The storage container of claim 2, wherein the bracket includes a plurality of apertures, the plurality of apertures receive the plurality of posts such that a clearance is provided between each aperture of the plurality of apertures and each corresponding post of the plurality of posts.

5. The storage container of claim 2, wherein the bracket includes a longitudinal expanse disposed between a first end and a second end, a first flange extends outwardly from the longitudinal expanse proximate the first end, a second flange extends outwardly from the longitudinal expanse, in an opposite direction to the first flange, proximate the second end.

6. The storage container of claim 5, further including a container flange disposed on the head, a plate is mounted to the container flange, the manifold is mounted to the plate, the first end of the bracket is secured to the plate.

7. The storage container of claim 1, wherein the cryogenic plumbing assembly is clamped to the bracket.

8. The storage container of claim 1, wherein the first end block is adjustably coupled to the at least one post of the plurality of posts and the second end block is adjustably coupled to the at least one other post of the plurality of posts.

9. The storage container of claim 1, wherein the cryogenic plumbing assembly includes one of a plumbing grouping, a 4-way manifold, a first hand valve, a second hand valve, a delivery tube, and a plumbing member.

* * * * *